Feb. 27, 1962 T. R. SMITH 3,022,581
CLOTHES DRIER
Filed May 3, 1955 6 Sheets-Sheet 1

Fig.1.

Inventor
Thomas R. Smith
by James S. Nettleton
Attorney

Feb. 27, 1962 T. R. SMITH 3,022,581
CLOTHES DRIER
Filed May 3, 1955 6 Sheets-Sheet 2

Fig.2.

Inventor
Thomas R. Smith
by James L. Nettleton
Attorney

Feb. 27, 1962 T. R. SMITH 3,022,581
CLOTHES DRIER
Filed May 3, 1955 6 Sheets-Sheet 5

Inventor
Thomas R. Smith
by James S. Nettleton
Attorney

Feb. 27, 1962 T. R. SMITH 3,022,581
CLOTHES DRIER
Filed May 3, 1955 6 Sheets-Sheet 6

Inventor
Thomas R. Smith
by James S. Nettleton
Attorney

United States Patent Office 3,022,581
Patented Feb. 27, 1962

3,022,581
CLOTHES DRIER
Thomas R. Smith, Newton, Iowa, assignor to The Maytag Company, Newton, Iowa, a corporation of Delaware
Filed May 3, 1955, Ser. No. 505,694
22 Claims. (Cl. 34—75)

This invention relates to a clothes drier utilizing a water condenser system to remove entrained moisture from heated vapors withdrawn from a drying chamber within the clothes drier.

Though a majority of the domestic clothes driers now in public use are of the type in which damp fabrics are agitated in an environment of air taken from the ambient atmosphere, heated, passed through a drying chamber containing the damp fabrics, and then exhausted again into the ambient atmosphere, this clothes drier is of a type which neither takes air from nor vents air to the ambient atmosphere. In this latter type clothes drier, air confined within the drier casing is heated, passed through the drying chamber containing the damp fabrics and then passed through or over some type of vapor condenser to condense moisture out of the air and leave the air in a cooled condition of lower moisture content to be reheated and recirculated through the drying chamber again.

Specifically, this clothes drier is of a type in which heated air is passed through the drying chamber containing the damp fabrics, through a lint trap to remove lint from the circulating air, and then into a blower-condenser unit to remove a large portion of the entrained moisture from the air before the air is reheated and recirculated again. The blower-condenser unit is supplied with cooling fluid which produces a cool spray or mist within the blower-condenser unit to cool, condense and coalesce with the entrained moisture expelled from the drying chamber.

This blower-condenser unit not only removes a large portion of the entrained moisture from the vapor entering the blower-condenser unit but also centrifugally extracts the coalesced mixture of the cooling fluid and the resulting condensate from air expelled through the outlet of the unit by means of a rotor or impeller within the unit. In addition, the condensing fluid and condensate accumulating within the unit is pumped to an external drain by the same rotor which moves the air in its circulatory path through the drying chamber.

In my copending application, Serial No. 259,580, filed December 3, 1951, now Patent No. 2,717,456, and assigned to the same assignee as that of this application, a water film condenser principle is utilized to remove entrained moisture from the vapors contained within the drying chamber.

In the drier of that application there is no defined circulatory path for the air as it moves within the casing encompassing the clothes receiving drum. Instead, various air paths are generated by differences of vapor pressures within the casing as well as by the rotation and movement of clothes within the drum itself. Though good results have been attained by the use of this water condenser drier which depends upon the circulation of air from an upper heater quadrant to a cooling and condensing water film on a diametrically opposite lower quadrant within the casing, certain disadvantages are inherent in this construction.

First, though some lint shaken loose in the use of this water film condenser drier was deposited on the water film itself and flushed down the drain together with the cooling fluid and its condensate, not all of the lint was always deposited on this water film. As a result of this failure to trap all lint produced by the agitation of fabrics within the drum, some lint was deposited on the drum itself as well as other interior surfaces of the casing.

It is therefore one of the objects of this invention to eliminate this lint problem by providing a water condenser drier from which lint may be successfully and easily removed.

Second, while the prior type water condenser drier was efficient in drying damp fabrics placed within the drum, the failure to provide a definite circulatory path within this drier resulted in a certain percentage of the air remaining constantly in a heated condition. This in turn prevented the moisture retained in that air from being condensed out as quickly as if it had been cooled, reheated and then recycled through the clothes drying drum again.

It is therefore another object of this invention to provide a clothes drier which will provide a greater control over the temperature and the humidity of the air as it passes through various stages of its cycle in order to produce a shorter drying period and more efficient clothes drier.

Though my invention relates to a device having distinct advantages in a drier of the closed air circuit type as set forth in the preceding paragraphs, it is to be understood that its use need not necessarily be limited to that type drier. It is possible under certain conditions that air of reduced moisture content may be discharged from the blower-condenser unit into the ambient atmosphere rather than to be reheated and recycled through the drier again.

The prime object of this invention, therefore, is to produce a blower-condenser unit capable of receiving heated air containing entrained moisture and then condensing out that entrained moisture by passing the air and moisture vapors through a shower or mist chamber and thereafter centrifugally extracting the resulting coalesced condensate and cooling fluids from the air of decreased moisture content discharged from the blower-condenser unit.

A further object is to produce a blower-condenser unit which will not only produce a mist or spray to condense moisture from the heated vapors entering the unit but which will also provide the necessary forces to move the air through the unit itself.

A still further object of this invention is to provide a combined vapor condenser and pump unit capable of not only condensing and separating moisture vapors from air passing through the unit, but also capable of pumping accumulated fluids smoothly from the unit itself.

An additional object of this invention is to safeguard the operation of a clothes drier embodying my invention by providing a safety device which will completely shut down the drier operation if there is either insufficient water pressure for the water condenser unit or an impairment of operation of the water pump or its drain connections.

Other objects, advantages and feature of this invention will become more apparent when reference is made to the following specification and drawings in which.

Referring to the accompanying figures for the construction of a clothes drier embodying my invention, it can be seen that the casing 10 is covered by insulation 11 and is supported on legs 12 resting on the base frame 13 which in turn is supported by the adjustable feet 14 and serves as a part of the cabinet 15 enclosing casing 10.

Casing 10 which includes front wall 17, cylindrical wall 18 and back wall 19 defines a drying chamber 20 provided with access opening 21 and those openings 22 and 23 which permit the flow of air into and out of the drying chamber 20. Back wall 19 of casing 10 is provided with a journal bearing structure, generally indicated by the numeral 25, which journals shaft 26 having its opposite ends rigidly attached to pulley 27 and spider 29, the latter of which supports the revoluble drum 28 by means of its connection to rear drum wall 31.

In addition to rear wall 31, drum 28 is provided in this embodiment with a perforate cylindrical wall 32 and a front wall 33 having an access opening 34 in alignment with access opening 21 of casing 10. Cabinet 15 is also provided with an access opening 36 and a door 37 which in its closed position seats against the static seal 38 projecting through drum opening 34 and is fitted into openings 21 and 36 of casing 10 and cabinet 15 respectively.

Figure 1:
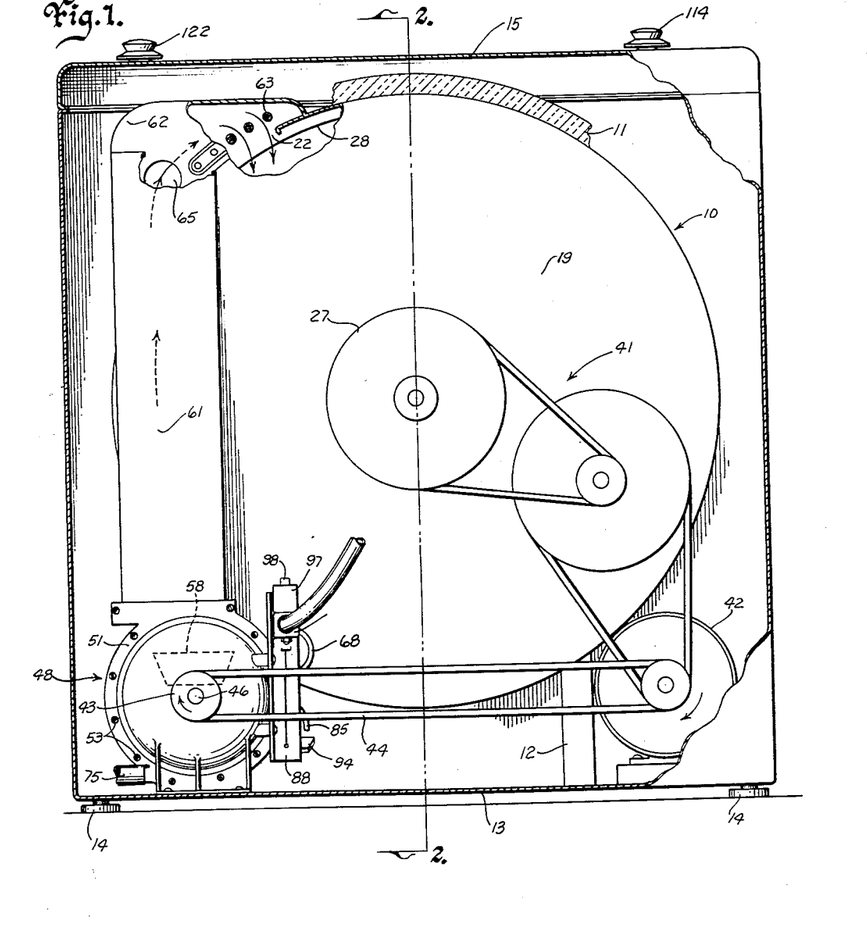
FIGURE 1 is a rear elevation, partially broken away, showing a clothes drier embodying my invention.
Figure 2:
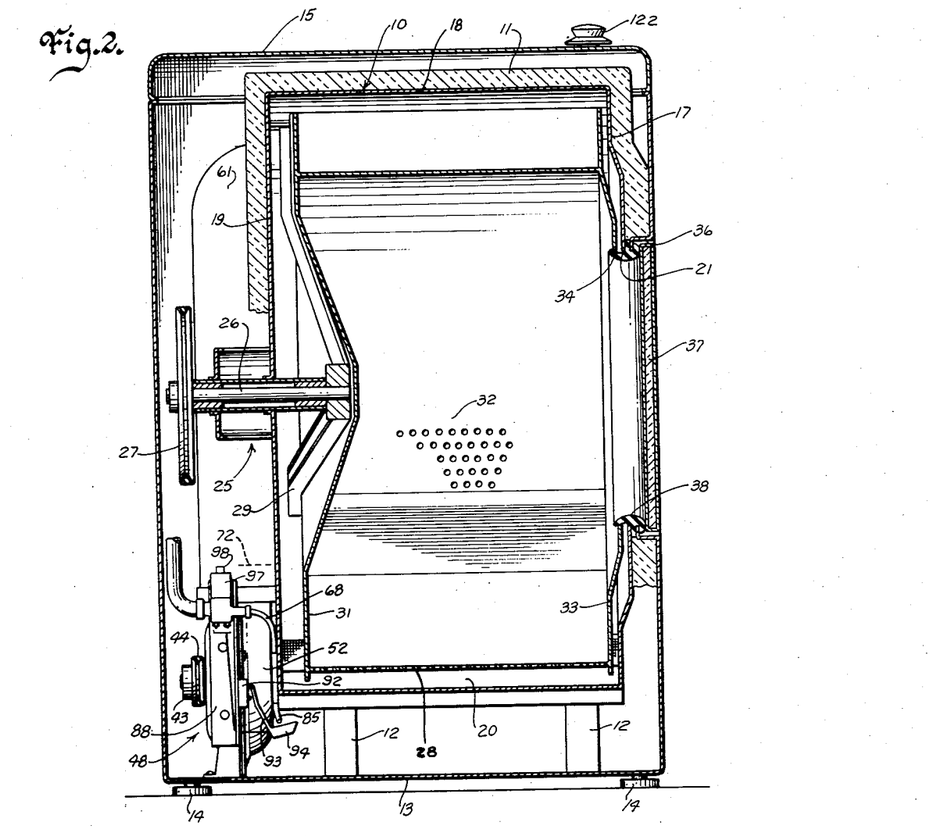
FIGURE 2 is a vertical sectional view taken on line 2—2 of FIGURE 1.

As apparent from FIGURE 1, drum 28 and its driving pulley 27 are driven through a conventional speed reducing belt and pulley system indicated by the arrow 41. Motor 42 mounted on base frame 13 provides the driving power for belt and pulley system 41.

Motor 42 also drives pulley 43 through a belt 44 to rotate the rotor or impeller member 45 fastened to shaft 46 which projects outwardly from the radial bearing 47 and in the blower-condenser unit generally indicated by the arrow 48.

In this illustrative embodiment, the rotor member 45 is enclosed by cooperating castings 51 and 52 joined together by suitable connectors 53. While casting 51 mounts the water-tight bearing 47, casting 52 is provided with a short cylindrical duct 55 which extends both outwardly and inwardly from the wall of casting 52 supporting it. Cylindrical duct 55 serves as an intake of the blower-condenser unit 48 and is pressed into the combination seal and water dam 54 which is tightly fitted to and preferably clamped around the air exhaust opening 23 of casing 10. Cylindrical duct 55 and the cooperating opening 23 are positioned near the bottom of casing 10 in the depending box-like lint trap appendage forming a part of casing 10 and generally indicated by the arrow 56. This lint trap assembly 56 is provided with internal guide rails 57 which support a conventional lint trap 58 slightly above the elevation of the air exhaust opening 23.

Figure 3:
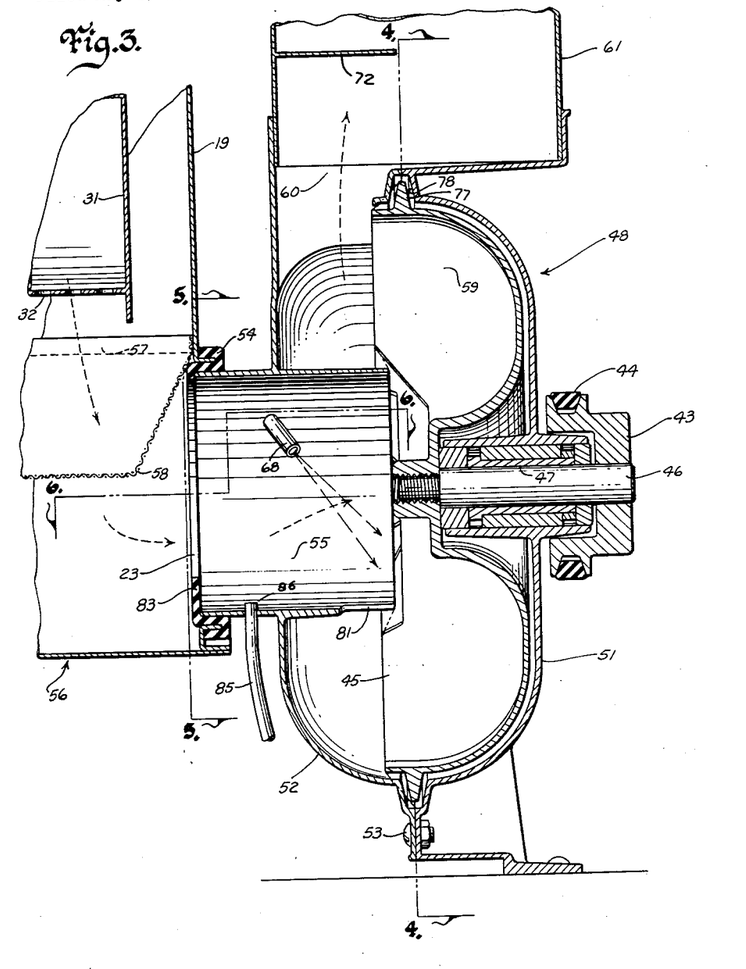
FIGURE 3 is an enlarged vertical cross section taken through the blower-condenser unit showing its relationship with the clothes drum, lint trap, casing and the air outlet leading to the heater unit.
Figure 4:
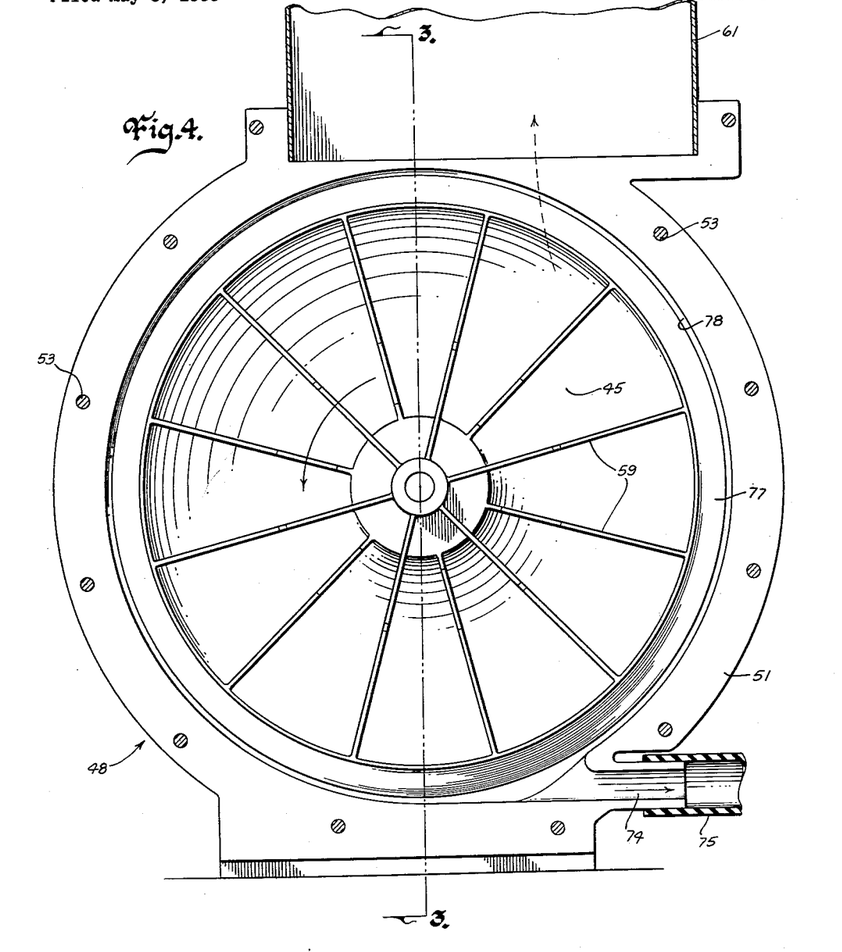
FIGURE 4 is a view taken on line 4—4 of FIGURE 3 showing the relationship between the impeller of the blower-condenser unit and its air and drain outlets.
Figure 5:
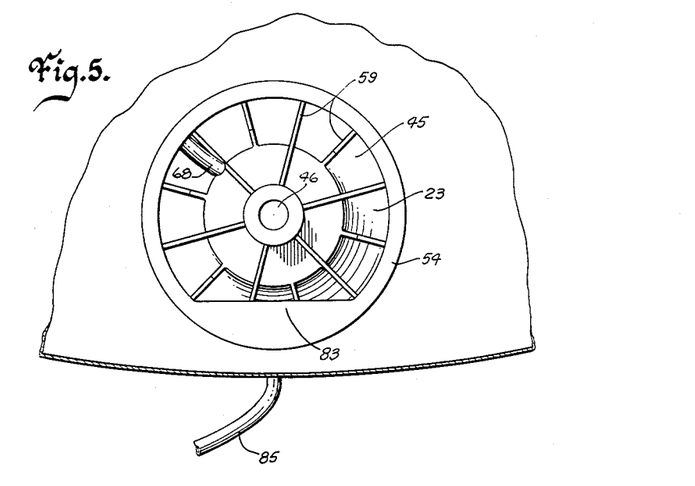
FIGURE 5 is a view taken on line 5—5 of FIGURE 3 showing the positioning of the condensing fluid conduit in the blower-condenser unit together with the drain hose leading to the safety shut-off device.
Figure 6:
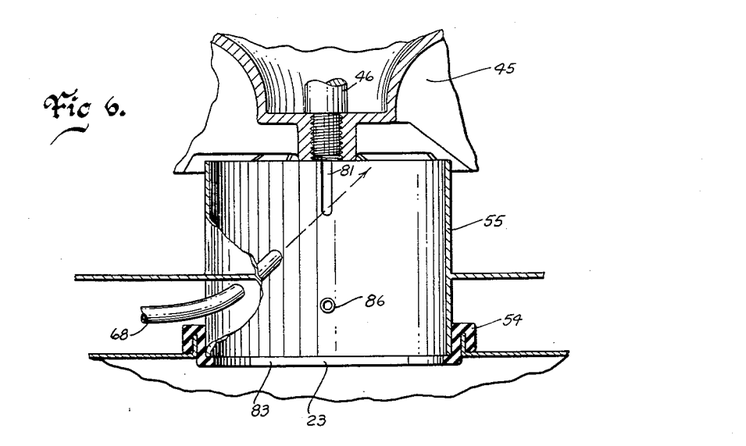
FIGURE 6 is a cross section taken on line 6—6 of FIGURE 3.

That portion of duct 55 extending inwardly into the blower-condenser unit 48 terminates just short of the recessed portions of blades 59 on rotor member 45. Air moved into duct 55 by movement of blades 59 passes out of unit 48 through an air discharge opening 60 formed by the cooperating castings 51 and 52 and enters the vertical conduit 61 extending upwardly along the back of casing 10. It should be noted from FIGURE 3 that conduit 61 is about twice as large as opening 60 in cross sectional area to reduce the velocity of air discharged from unit 48.

The upper end of conduit 61 joins heater housing 62 which encloses heater element 63 and is fastened to casing 10. Passage of air between conduit 61 and the heater housing 62 is made possible by an opening 65 in the sidewall of heater housing 62 while passage of air from heater housing 62 past heater element 63 and into casing 10 is made possible by the rectangular air inlet opening 22 in the cylindrical wall 18 of casing 10. Through the use of this structure just described a continuous air flow is provided by the rotation of impeller member 45 through casing 10 and its lint trap appendage 56 to the blower-condenser unit 48, conduit 61, heater housing 62 and back into casing 10 (note FIGURE 3).

Now with reference to the structure providing the water condensing feature of my invention, it can be seen in the accompanying figures that a water conduit 68 is supplied from the water valve 69 and feeds into the cylindrical section 55 adjacent casing 10 to discharge a stream of cooling fluid just below and laterally of the axis of rotation of impeller member 45. Though conduit 68 may be positioned in other ways to direct cooling fluid into unit 48, the positioning described and shown in the accompanying figures has proven satisfactory. The stream of cooling fluid issuing from conduit 68 passes through the tubular portion 55 and impinges against the central bladed portion 59 so that the rotation of rotor member 45 causes the stream of cooling fluid to be dispersed into fine particles in the blower-condenser unit 48. A similar dispersion effect is produced by use of a spray nozzle on the end of conduit 68.

A shower of varying size cooling particles resulting from the impinging of the cooling stream on rotating member 45 is therefore constantly present within unit 48 to condense and agglomerate with those moisture vapors entering duct 55 as well as scrubbing the incoming air free of any particles of lint that may possibly escape past lint trap 58. The horizontal baffle member 72 fixed within conduit 61 a short distance above outlet 60 is approximately of the same cross sectional area as opening 60 to prevent fluid droplets from being thrown upwardly into the area of the heater housing 62 by impeller member 45. Those water droplets escaping into the lower region of conduit 61 provide a condensing water film as they flow downwardly into the interior surfaces within unit 48. It should be noted here that the rotating impeller member 45, responsible for the movement of air through unit 48 and for the dispersion of fine fluid particles within unit 48, is also responsible for the centrifugal extraction and separation of fluids from the air passing from unit 48. In its rotation within unit 48 rotor member 45 flings the coalesced mass of cooling fluid and condensate away from rotor 45 and outwardly against the inner peripheral surfaces of casting 52 as its cup-like centrally located sections whirl through the spray within the unit.

In order to empty unit 48 of the fluids accumulating in the lower portion of that unit, castings 51 and 52 cooperate to form a water discharge port 74 arranged in a tangential relationship to the lowest portion of impeller member 45. Water discharge port 74 empties into drain hose 75 connected to an external drain (not shown).

To pump accumulated fluids from unit 48, rotor member 45 is provided with an annular rim portion 77 of V-shaped cross section which fits closely within an annular recess 78 of similar cross section formed by the cooperating castings 51 and 52. Though parts 77 and 78 need not be of this precise cross section, it will be apparent that these cooperating parts form a pump capable of removing the fluids gathering within unit 48. Due to the fact that the pumping action of the cooperating parts 77 and 78 is achieved by a frictional coupling between the smooth surfaced pump rim 77 and the fluid between the closely spaced members 77 and 78 rather than by blades or hydraulic scoops, there is little noise resulting from its operation. In addition, there are no slapping or sloshing noises resulting from rhythmic changes of water levels within recess 78 as is possible with the use of a pump member having radial vanes. Though rim 77 is a smooth, uninterrupted annulus in this embodiment to maintain a low noise level of operation, it still is effective in flushing through drain port 74 that quantity of lint too small to be captured by lint trap 58 and escaping into duct 55. If desired, rim 77 may be provided with radial slots to loosen and prevent lint accumulations within the blower-condenser unit whenever the mesh used in lint trap 58 allows a greater amount of lint to pass through that unit.

With respect to the safety provisions of the blower-condenser unit 48, it can be seen that even though the water impinging against blades 59 from conduit 68 will, for the most part, be dispersed below the lowest level of the short cylindrical duct 55, some splash back onto the inner surfaces of duct 55 may occur. Slot 81 in duct 55 near blades 59 serves as a drain for most of the fluid splashed into this cylindrical intake, but for positive protection against any draining of fluids into the lint trap assembly 56, other preventatives are provided.

The first of these preventatives takes the form of the chord portion 83 of seal 54 which forms a dam between casing 10 and duct 55. Through the use of this seal 54, water must rise to the top of dam 83 in order to pass into casing 10. Since an accumulation of sporadic water droplets alone will never fill duct 55 to overflow dam 83 so long as unit 48 is provided with effective pump and drain facilities, a substantial rise in fluid level within duct 55 may be used to sense difficulty in these latter facilities. Therefore, this invention provides a safety shut-off device sensitive to increased amounts of water within the hollow cylindrical section 55 and capable of shutting down water flow into unit 48 through conduit 68 as well as disrupting complete drier operation once it has responded to the presence of this additional water within duct 55.

This is accomplished by the use of a safety shut-off device generally indicated by the numeral 84 (FIGURE 7) and the drain hose 85 having its upper end 86 terminating at a level slightly higher than the lowest inner surface of duct 55. The safety device 84 is mounted on the lower end of a bracket 88 carried by casting 51 and has for its particular objective the control of the sump switch 92 forming a part of the safety apparatus 84 and shown schematically in the neutral wire of the conventional three-wire 230 volt system of FIGURE 8.

Sump switch 92 in this embodiment is a single-pole single-throw switch which is internally biased to a closed position if no external forces are acting on its control arm 93. Switch control arm 93 is fastened to a water pan 94 having a weight incapable in itself of moving switch control arm 93 downwardly to open switch 92.

Mounted above sump switch 92 on bracket 88 is the water valve 69 provided with inlet 92 and outlet 96 communicating with unit 48 through hose 68. Valve plunger 97, slidably mounted within the nonmagnetic plunger retainer 98, is urged downwardly into the apertured center of the valve diaphragm element 99 by means of spring 100 within the upper end of retainer 98. Flow through the apertured center of diaphragm 99 is interrupted by this coaction with plunger 97.

Figure 7:
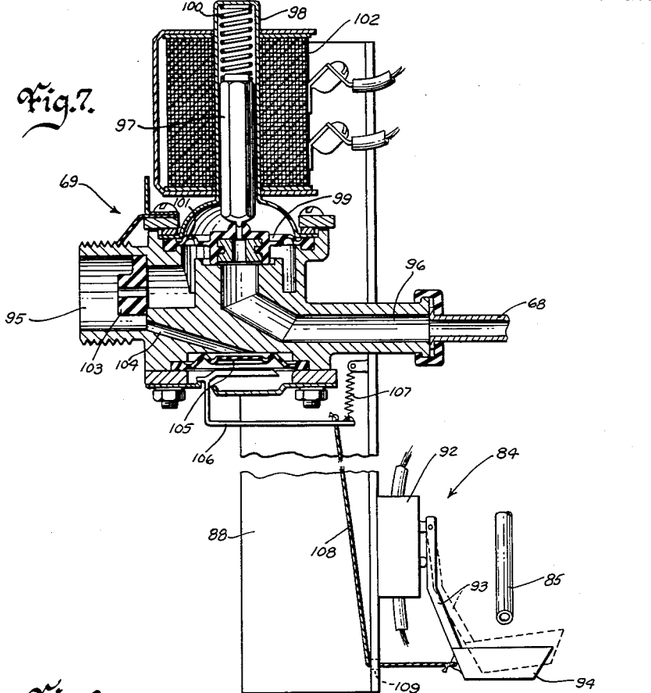
FIGURE 7 is a side elevation, partially in section, showing the operative relationship between the water inlet valve and the water pan in controlling the safety sump switch.

Once flow through the center of diaphragm 99 has been terminated by a downward movement of plunger 97, diaphragm valve element 99 seats itself by means of downstream fluid pressure due to the fact that hole 101 in diaphragm 99 equalizes the fluid pressure on both sides of diaphragm 99 which, in its seated position of FIGURE 7, has a greater downstream area exposed to this pressure than does its upstream side. However, once valve solenoid 102 is energized to move plunger 97 away from the apertured center of diaphragm 99 against the bias of spring 100, fluid will be permitted to pass through the center of diaphragm element 99 and will reduce the fluid pressure on the downstream side of diaphragm 99 in comparison with the fluid pressure present on its upstream side. This difference of pressures will unseat valve diaphragm 99 and will permit full fluid flow through flow control member 103 and the fluid passage of valve 69.

In addition to inlet 95, the upstream side of valve 69 is provided with a small passageway 104 communicating with pressure sensitive diaphragm 105 adjacent a pressure plate forming part of a J-shaped control arm 106 which pivots on the lower side of valve 69 in response to movement of diaphragm 105. In this embodiment a downward movement of diaphragm 105 due to the presence of water pressure within valve 69 will cause a similar downward movement of arm 106.

Arm 106 is biased upwardly by coil spring 107 and is connected to pan 94 by means of the cord 108 which passes through eyelet 109 in bracket 88. This bias of coil spring 107 causes switch control arm 93 to be pulled downwardly into the solid position of FIGURE 7 to open switch 92. Thus it can be seen that coil spring 107 opposes the internal bias of switch 92 and will maintain that switch in its open position so long as there is insufficient water pressure applied at the inlet of valve 69 to move diaphragm 105 downwardly against the pressure plate of arm 106 to relieve the tension on cord 108. However, when water pressure is supplied to valve 69, application of fluid pressure through passageway 104 and against pressure sensitized diaphragm 105 will move the latter against the pressure plate of arm 106 and pivot that arm downwardly on the body of valve 69 against the bias of spring 107 to relieve the tension on cord 108. This will permit pan 94 to move into its dotted line position with switch 92 closing under its own internal biasing action. This feature prevents any operation of the clothes drier unless the operator first supplies water pressure to valve 69 from an external source.

Switch 92 may, however, be moved again into its open position to prevent further operation of the drier whenever a predetermined amount of water collects in pan 94 as a result of water flow through hose 85 from duct 55. Under such a condition the additional weight of water from duct 55 will move switch arm 93 and pan 94 into their solid line positions from the operating dotted line position corresponding to the closed position of switch 92.

Because of the constant accumulation of the sporadic droplets on the inner floor of cylindrical section 55 during the impinging of cooling fluid on blades 59, the positioning of end 86 of hose 85 flush with the inner surface of the tubular portion 55 would create a steady flow through hose 85 even though these same droplets would slowly drain through slot 81 and fall to the bottom of unit 48 if given the time to do so. To prevent such a premature flow through hose 85, end 86 is positioned at a level slightly higher than the lowest position of the floor of duct 55. By so positioning the end 86, sump switch 92 will not be opened under conditions within the blower-condenser unit 48 which do not constitute conditions of danger such as would result from the clogging of water discharge outlet 74 or the impairment of rotation of impeller member 45.

Figure 8:
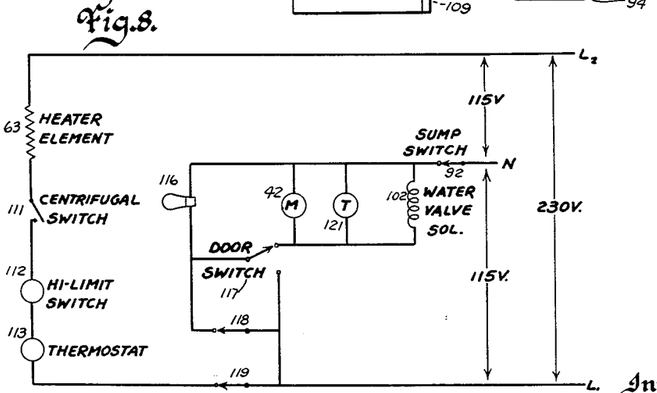
FIGURE 8 is a simplified electrical wiring diagram showing the relationship of the major electrical components for operating a drier embodying my invention.

In order to operate a clothes drier embodying my invention a simplified electrical wiring diagram is illustrated in FIGURE 8. This wiring diagram includes not only certain electrical components previously set forth but also certain conventional components normally present in clothes driers and hence forming no part of this invention. In addition to the heater element 63, drive motor 42, water valve solenoid 102 and the sump switch 92, FIGURE 8 includes a centrifugally operated switch 111 controlled by the rotational speed of motor 42, a high limit switch 112 preferably located in the heater housing 62, and a conventional bulb type thermostat 113 which may be preset by control knob 114 to achieve a predetermined drying temperature within casing 10.

FIGURE 8 also includes an interior lamp 116 and a conventional door switch 117 in addition to a pair of timer switches 118 and 119 controlled by the timer motor unit 121 and its timer control knob 122. In this illustrative wiring diagram, door switch 117 is arranged to energize motor 42, timer unit 121 and water valve solenoid 102 when door 37 is moved into its closed position. With door 37 closed, switch 117 is positioned as indicated in FIGURE 8. When door 37 is opened, door switch 117 energizes the interior 116 while deenergizing motor 42, timer unit 121 and water valve solenoid 102.

In this embodiment both of the timer switches 118 and 119 are so constructed as to be closed at the beginning of the drying cycle by rotation of the timer control knob 122. Continued rotation of knob 122 by the energized motor timer unit 121 will cause timer switch 119 to break the heater circuit approximately five minutes before the timer switch 118 is opened to deenergize the units controlled by that latter switch.

To initiate operation of a clothes drier embodying my invention, the operator supplies electrical power to lines N, L₂ and L₁ by some external electrical source. This, alone, energizes no component parts. The operator next supplies valve 69 with water pressure by opening an external water line leading to that valve. This application of water pressures moves diaphragm 105 downwardly to pivot arm 106 downwardly against the bias of spring 107. Movement of arm 106 downwardly releases the tension of cord 108 and allows the internal bias of switch 92 to move switch arm 93 and water pan 94 into their dotted line positions and close switch 92.

Next, the temperature control knob 114 is moved into the desired position by the operator. After temperature control knob 114 is set for predetermined drying temperature, the operator inserts damp fabrics to be dried through the access openings 21, 34, and 36 and then closes door 37 to move the door switch 117 into the position shown in FIGURE 8.

The timer control knob 122 is then rotated into a position to close both of timer switches 118 and 119 and energize all elements in FIGURE 8 with the exception of those in the heater circuit which remain open due to the open position of the centrifugally operated switch 111 controlled by motor 42. Upon the closing of timer switch 118, the interior lamp 116 and those components including drive motor 42, timer control unit 121 and the water valve solenoid 102 connected in parallel with the interior lamp 116 through the door switch 117 are energized through sump switch 92 between the neutral and L₁ wires.

Meanwhile, the energization of drive motor 42 rotates drum 28 through belt and pulley system 41 to tumble the fabrics within drum 28. It also rotates rotor member 45 through pulley 43 and belt 44 to create an air flow into duct 55, through unit 48, duct 61, heater housing 62, drying chamber 20, lint trap assembly 56 and back into the duct 55 for a complete circulatory air path.

The energization of this parallel circuit also causes the timer unit 121 to slowly rotate the cams (not shown) controlling the switches 118 and 119 in a conventional manner.

Water solenoid 102 is also energized permitting fluid flow through valve inlet 95, outlet 96, and hose 68 into blower condenser unit 48 where the water discharge from conduit 68 strikes blades 59 at a point slightly below and to one side of the axis of rotation of impeller member 45. This impinging of the cooling fluid against blades 59 cools rotor 45 and the interior of unit 48 and disperses the cooling fluid into a spray and mist within unit 48. At the same time the pump formed by the parts 77 and 78 quietly discharges the cooling fluid through drain outlet 74 as the fluid falls to the bottom of unit 48.

Upon reaching a predetermined speed, motor 42 closes centrifugally operated switch 111 to close the heater circuit through timer switch 119, high limit switch 112 and the thermostat 113 across lines L₁ and L₂. This heats the air passing into the drying chamber 20 through opening 22 and causes the moisture retained by the fabrics to evaporate into moisture vapor which flows from casing 20 over the circulatory path previously described.

The heated lint-free moisture laden air passing from lint trap 53 and entering duct 55 suddenly encounters the cooler region existing around duct 55 as well as coming into contact with the cooler interior parts of unit 48 itself. A cooling of the air and moisture vapor entering duct 55 results with the condensed moisture vapors agglomerating with the mist and spray within unit 48. Moisture vapor also condenses on the interior surfaces of unit 48 in addition to coalescing with the fluid droplets momentarily suspended within the unit itself. This action quickly cools the incoming air and reduces its absolute humidity even though the relative humidity of the air discharged through opening 60 may be high.

It should be noted here that while some vapor condenses directly on the cool inner surfaces of unit 48 and flows to the bottom of that unit that the coalesced mass of cooling fluid and condensate resulting from the sudden condensation immediately around duct 55 encounters the whirling blades 59 and is centrifugally extracted from the central portion of the unit 48 by rotor member 45 and is thrown against the inner periphery of casting 52 to separate these fluids from the cooled air passing through opening 60.

The cooled air leaving unit 48 through opening 60 passes around the moisture baffle plate 72 before decreasing its velocity in the enlarged duct 61. From duct 61 the air passes through opening 65 into heater housing 62 and over heater element 63 before entering drying chamber 20 by way of opening 22 to be recirculated again. Though of high relative humidity upon entrance into duct 61, the air leaving heater housing 62 and entering chamber 20 has decreased greatly in relative humidity to allow its retention of the additional moisture evaporated from the fabrics.

Unless interrupted by the high limit switch 112 or the thermostat 113 which disrupt the operation of the heater circuit whenever regions sensed by these devices exceed predetermined temperatures, the drier continues steadily without change under the control of timer unit 121. In this embodiment the timer switch 119 under the control of timer control unit 121 opens the heater circuit and deenergizes the heater element 63 approximately five minutes before the termination of the drying cycle. This allows the fabrics to continue to tumble within drum 28 while utilizing the residual heat within casing 10 as well as providing a cooling-off period for the fabrics before they are handled by the operator. At the end of the drying cycle when the timer switch 118 is opened by timer control unit 121, the interior lamp 116 together with the parallel components 42, 121 and 102 are deenergized to shut the drier completely down. Interior lamp 116 is again energized through door switch 117 when door 37 is opened to actuate that switch.

It should be noted that the drier operation may be completely shut down by the opening of either the switches 117 or 92. Opening of door switch 117 provides an energizing circuit for interior lamp 116 but disconnects the drive motor 42, timer control unit 121 and the water valve solenoid 102. Interruption of the energizing power for motor 42 not only deenergizes motor 42 but also deenergizes the heating circuit by opening the centrifugally operated switch 111 in series with heater element 63.

In addition, opening of switch 92 by insufficient water pressure on diaphragm 105 or by the presence of water with pan 94 will completely shut down drier operation since, like switch 117, switch 92 controls motor 42 and hence its centrifugally operated switch 111.

While only one embodiment of my invention has been shown in the accompanying drawings, it is understood that variations of this embodiment may be made including variations in the construction or placement of blower-condenser unit with respect to the remaining parts of the drier without departing from the scope of the invention as set forth in the following claims.

I claim:

1. In a clothes drier having means defining a drying chamber and a heating unit for evaporating moisture from damp fabrics placed within said drying chamber, a vapor condenser for removing moisture vapors from said drying chamber, comprising a blower unit communicating with said drying chamber, said blower unit including a bladed impeller for pumping air and moisture vapors from said drying chamber, an air outlet in said blower unit for discharge of air pumped from said drying chamber, means for forcibly directing a stream of cooling fluid onto said bladed impeller of said blower unit to break up said cooling fluid into fine fluid particles to condense said moisture vapors by coalescence, and means for rotating said impeller to centrifugally separate said coalesced cooling fluid and condensed vapors from air discharged through said air outlet.

2. In a clothes drier having means defining a drying chamber and a heating unit for evaporating moisture from damp fabrics placed within said drying chamber, a vapor condenser for removing moisture vapors from said drying chamber comprising, a blower unit communicating with said drying chamber, said blower unit including an impeller for pumping air and moisture vapors from said drying chamber, an air outlet in said blower unit for discharge of air pumped from said drying chamber, means for directing cooling fluid into said blower unit towards said impeller to condense said moisture vapors by coalescence with said cooling fluid, a drain outlet in said blower unit, means on said impeller for pumping fluids from said blower unit through said drain outlet, and means for rotating said impeller to centrifugally separate said coalesced cooling fluid and condensed vapors from air discharged through said air outlet.

3. In a clothes drier having means defining a drying chamber and a heating unit for evaporating moisture from damp fabrics placed within said drying chamber, a vapor condenser for removing vapors from said drying chamber comprising, a blower unit, duct means interconnecting said drying chamber and said blower unit, said blower unit including a rotatable impeller for pumping air and moisture vapors from said drying chamber through said duct means, an air outlet in said blower unit for discharge of air pumped from said drying chamber by said impeller, conduit means for directing cooling fluid into said blower unit against said impeller to condense said moisture vapors by coalescence with said cooling fluid, valve means controlling fluid flow through said conduit means, safety means responsive to fluid levels within said blower unit controlling said valve means, a drain outlet in said blower unit for discharge of fluids from said blower unit, and means for rotating said impeller to centrifugally separate said coalesced cooling fluid and condensed vapors from air discharged through said air outlet.

4. In a clothes drier, a vapor condensing unit comprising, a housing for said unit, said unit having an inlet for passage of air and moisture vapors into said housing, an air discharge opening in said housing, a revoluble impeller within said housing, said impeller having blades for movement of air into said inlet and out of said discharge opening, means for injecting cooling fluid into said housing to condense and coalesce with moisture vapors entering said housing, a drain opening in said housing, means on said impeller for pumping accumulated fluids within said housing through said drain opening during rotation of said impeller, and means for rotating said impeller to centrifugally extract said coalesced cooling fluid and condensed moisture vapors from air discharged through said discharge opening.

5. In a clothes drier, a vapor condensing unit comprising, a housing for said unit, said unit having an intake duct for passage of air and moisture vapors into said housing, an air discharge opening in said housing, a revoluble impeller within said housing, said impeller being mounted with its axis of rotation coaxial to said duct and having a bladed portion immediately adjacent to said duct for movement of air into said duct and out of said discharge opening, means for injecting cooling fluid into said housing to condense and coalesce with moisture vapors entering said housing, said duct protruding into said housing to form a splash shield for minimizing splash back of cooling fluid into said duct during rotation of said impeller, and means for rotating said impeller to centrifugally extract said coalesced cooling fluid and condensed moisture vapors from air discharged through said discharge opening.

6. In a clothes drier, a vapor condensing unit comprising, a housing for said unit, said unit having an inlet for passage of air and moisture vapors in said housing, an air discharge opening in said housing, a revoluble impeller within said housing, said impeller having blades for movement of air through said inlet discharge opening, conduit means for injecting cooling fluid into said housing to condense and coalesce with moisture vapors entering said housing, a drain port in said housing, an annular fin on said impeller cooperating with said housing to form a pump for pumping fluid through said drain port during rotation of said impeller, and means for rotating said impeller to separate said coalesced cooling fluid and condensed moisture vapors from air discharged through said discharge opening.

7. In a clothes drier, a vapor condensing unit comprising, a housing for said unit, said unit having an intake duct for passage of air and moisture vapors into said housing, an air discharge opening in said housing, a revoluble impeller within said housing, said impeller having blades for movement of air through said duct and through said discharge opening, conduit means for injecting fluid into said housing to condense and coalesce with moisture vapors entering said housing through said duct, a drain port in said housing, means preventing back flow of cooling fluid through said duct, means for rotating said impeller to separate cooling fluid and condensed moisture vapors from air discharged through said discharge opening, and means responsive to the presence of accumulated fluids within said duct for interrupting fluid flow through said conduit means.

8. A combined vapor condenser and pump unit comprising, a housing, a rotor member, means journalling said rotor member for rotation within said housing, an air discharge opening in said housing, a fluid drain port in said housing tangential to the periphery of said rotor member, said rotor member including a central bladed portion for moving air through said unit and out of said opening upon rotation of said rotor member, means for impinging cooling fluid against said bladed portion to disperse said cooling fluid into droplets and condense said water vapor into condensate by coalescence with said cooling fluid, said rotor member further including a peripheral portion cooperating with said housing to form a pump for pumping accumulated fluid from said housing through said drain port upon rotation of said rotor member, and means for rotating said rotor member to centrifugally extract said cooling fluid and condensate from air entering said housing while simultaneously pumping accumulated cooling fluid and condensate through said drain port and discharging air through said opening.

9. A combined vapor condenser and pump unit comprising, a housing, a rotor member, means journalling said rotor member for rotation within said housing, means for passing air and water vapor into said housing, an air discharge opening in said housing, a fluid drain port in said housing tangential to the periphery of said rotor member, said rotor member including a central bladed portion for moving air through said unit and out of said opening upon rotation of said rotor member, means for cooling the exterior surface of said rotor member to condense said water vapor into condensate, said rotor member further including a peripheral portion cooperating with said housing to form a pump for pumping fluids from said housing through said drain port upon rotation of said rotor member, and means for rotating said rotor member to centrifugally separate said condensate from the air within said housing while simultaneously pumping accumulated condensate through said drain port and discharging air through said opening.

10. A combined fluid separator and pump unit comprising, a housing, a rotor member, means journalling said rotor member for rotation within said housing, means for impinging a mixture of air and water against said rotor member, an air discharge opening in said housing, a fluid drain port in said housing tangential to the periphery of said rotor member, said rotor member including a central bladed portion for moving air through said unit and out of said opening upon rotation of said rotor member, said rotor member further including a peripheral portion cooperating with said housing to form a pump for pumping accumulated fluids through said drain port upon rotation of said rotor member, and means for rotating said rotor member in the mixture of air and water impinging on said rotor member to centrifugally separate the water from the air while simultaneously pumping water through said drain port and discharging air through said opening.

11. A clothes drier for drying moist fabrics comprising, a casing defining a drying chamber for said fabrics, heating means for evaporating moisture from said fabrics, a vapor condenser communicating with said drying chamber, said vapor condenser including a revoluble impeller having blades thereon for moving air from said drying chamber into said vapor condenser, means for rotating said bladed impeller, means including a conduit for forcibly directing cooling fluid into said vapor condenser against said blades of said impeller during rotation of said impeller to break up said cooling fluid into small particles within said vapor condenser for coalescing with evaporated moisture vapors from said drying chamber, said vapor condenser further including an air exhaust opening communicating with said casing for recirculating through said drying chamber that air expelled from said vapor condenser.

12. A clothes drier for drying moist fabrics comprising, a casing defining a drying chamber for said fabrics, a heating unit communicating with said drying chamber to evaporate moisture from said fabrics, a vapor condenser positioned outside said drying chamber and communicating with said drying chamber through a tubular member connected to said casing and provided with a terminal portion projecting into said vapor condenser to form a splash shield within said vapor condenser, said vapor condenser including a revoluble bladed member positioned adjacent said splash shield for moving air into and out of said vapor condenser, means for rotating said bladed member, conduit means for injecting cooling fluid into said vapor condenser against said bladed member to break up said cooling fluid into droplets to coalesce with the moisture in the humid air entering said vapor condenser from said drying chamber, means providing a drain for fluids injected into said vapor condenser, and baffled ductwork interconnecting said vapor condenser and said casing to recirculate through said drying chamber that air discharged from said vapor condenser.

13. A clothes drier for drying moist fabrics comprising, a casing defining a drying chamber for said fabrics, heating means for evaporating moisture from said fabrics, a vapor condenser including a housing communicating with said drying chamber, said vapor condenser including a revoluble rotor means for moving air into and out of said housing, means for rotating said rotor means, means including a conduit for injecting cooling fluid into said housing against said rotor means to disperse cooling fluid within said housing to condense and coalesce with moisture vapor moved into said vapor condenser from said drying chamber, a drain port in said housing, said rotor means having a portion thereof cooperating with said housing to form a pump for moving fluids through said drain port during rotation of said rotor means.

14. A clothes drier for drying damp fabrics comprising, a casing defining a drying chamber for receiving said fabrics, means for heating said fabrics to evaporate moisture therefrom, a housing defining an opening communicating with said drying chamber, an impeller mounted within said housing, means for rotating said impeller to force air-borne lint and moisture vapors into said housing from said drying chamber, conduit means for injecting cooling fluid into said housing against said impeller to condense moisture vapors from said drying chamber and scrub lint from air passing into said housing, and means on said impeller cooperating with said housing for pumping accumulating quantities of cooling fluid, condensate and lint from said housing.

15. A closed circuit clothes drier for drying moist fabrics comprising, a casing defining a drying chamber for said fabrics, a heating unit communicating with said drying chamber to evaporate moisture from said fabrics, a vapor condenser with an inlet passageway communicating with said drying chamber and an outlet passageway communicating with said heating unit to form a closed vapor circuit, said vapor condenser including a revoluble bladed member for moving air and moisture vapor from said drying chamber into said condenser and air from said condenser back to said drying chamber through said heating unit to form a closed circuit, means for rotating said bladed member in said condenser means for injecting a stream of cooling fluid into said vapor condenser and forcibly against said bladed member to atomize said cooling fluid into fine droplets to coalesce with the moisture in the humid air entering said vapor condenser from said drying chamber, and means providing a drain for fluids injected into said vapor condenser and the condensed vapors.

16. A closed circuit clothes drier for drying moist fabrics comprising, a casing defining a drying chamber for said fabrics, a heating unit communicating with said drying chamber to evaporate moisture from said fabrics, a vapor condenser with an inlet passageway communicating with said drying chamber and an outlet passageway communicating with said heating unit to form a closed vapor circuit, said vapor condenser including a revoluble member having blades thereon for moving air and moisture vapor from said drying chamber through said condenser and air back to said drying chamber through said heating unit to form a closed circuit, means for rotating said bladed member in said condenser, conduit means for injecting a stream of cooling fluid against said revoluble bladed member to break up said cooling fluid into fine droplets to coalesce within said bladed member with the moisture in the humid air entering said condenser from said drying chamber, and means providing a drain for fluids injected into said vapor condenser and the condensed vapors.

17. A clothes drying machine comprising a drying chamber, a clothes tumbling means disposed within said chamber, duct means communicating at one end with one region of said chamber and at the other end with a second region of said chamber, rotating air moving means for circulating air from said one region of said chamber through said duct means to said second region of said chamber, said air moving means comprising a radial type blower having a plurality of blades disposed about a central inlet and disposed for rotation about a non-vertical axis, condenser means for introducing a spray of cold water into said air as it passes through the said duct means to condense moisture therefrom, said condenser means comprising a cold water inlet for discharging a stream of cold water onto the blades of said air moving means whereby said air moving means serves to atomize said cold water and mix it through said air, means downstream of said air moving means for removing said cold water from said air, drain means arranged to drain the removed water without contacting the clothes in said tumbling means, and a heater for heating the drying air to extract said moisture from the clothes being tumbled.

18. A clothes drying machine comprising a drying chamber, clothes tumbling means disposed within said chamber, duct means communicating at one end with one region of said chamber and at the other end with a second region of said chamber, rotating air moving means for circulating air from said one region of said chamber to said duct means to said second region of said chamber, said air moving means comprising a blower having a plurality of blades disposed about a central inlet and disposed for rotation about a non-vertical axis, condenser means for introducing a spray of cold water into said air as it passes through said duct means to condense moisture therefrom, said condenser means comprising a cold water inlet for discharging a stream of cold water onto the blades of said air moving means whereby said air moving means serves to atomize said cold water and mix it through said air, means downstream of said air moving means for removing said cold water from said air, drain means arranged to drain the removed water without contacting the clothes in said tumbling means, and a heater for heating the drying air to extract said moisture from the clothes being tumbled.

19. In a clothes drier having means defining a drying chamber and a heating unit for evaporating moisture from damp fabrics placed within said drying chamber, a vapor condenser for removing moisture vapors from said drying chamber, comprising, a blower unit communicating with said drying chamber, said blower unit including a bladed impeller for pumping air and moisture vapors from said drying chamber, an air outlet in said blower unit for discharge of air pumped from said drying chamber, means for directing a stream of cooling fluid onto said bladed impeller of said blower unit to break up said cooling fluid into fine fluid particles to condense said moisture vapors by coalescense, means for removing the coalesced fluid from the air, drain means arranged to drain the coalesced fluid without contacting fabrics in said drying chamber, and means for rotating said impeller.

20. In a clothes drier having means defining a drying chamber and a heating unit for evaporating moisture from damp fabrics placed within said drying chamber, a vapor condenser for removing moisture vapors from said drying chamber, comprising, a blower unit communicating with said drying chamber, said blower unit including a bladed impeller for pumping air and moisture vapors from said drying chamber, an air outlet in said blower unit for discharge of air pumped from said drying chamber, means for directing a stream of cooling fluid onto said bladed impeller of said blower unit to break up said cooling fluid into fine fluid particles to condense said moisture vapors by coalescence, and means for rotating said impeller to centrifugally separate said coalesced cooling fluid and condensed vapors from air discharged through said air outlet.

21. In a clothes drier having means defining a drying chamber and a heating unit for evaporating moisture from damp fabrics placed within said drying chamber, a vapor condenser for removing moisture vapors from said drying chamber, comprising, a blower unit communicating with said drying chamber, said blower unit including a bladed impeller for pumping air and moisture vapors from said drying chamber, an air outlet in said blower unit for discharge of air pumped from said drying chamber, means for directing a stream of cooling fluid onto said bladed impeller of said blower unit to break up said cooling fluid into the fine fluid particles to condense said moisture vapors by coalescence, means for removing the coalesced fluid, and means for rotating said impeller.

22. A clothes drying machine comprising a drying chamber, clothes tumbling means disposed within said chamber, duct means communicating at one end with one region of said chamber and at the other end with a second region of said chamber, air moving means for circulating air from said one region of said chamber to said duct means to said second region of said chamber, said air moving means comprising a blower having a plurality of blades disposed about an inlet, means for introducing a spray of cold water into said air as it passes through said duct means to condense moisture therefrom, said last-named means comprising a cold water inlet for discharging a stream of cold water onto the blades of said air moving means whereby said air moving means serves to atmoize said cold water and mix it through said air to condense moisture therein, means downstream of said air moving means for removing said cold water and condensed moisture, drain means arranged to drain the cold water and condensed moisture without contacting the clothes in said tumbling means, and heater means for heating the drying air to extract said moisture from the clothes being tumbled.

References Cited in the file of this patent

UNITED STATES PATENTS

| | | |
|---|---|---|
| 950,607 | Baldwin | Mar. 1, 1910 |
| 2,012,608 | Landerman | Aug. 27, 1935 |
| 2,451,692 | Pugh | Oct. 19, 1948 |
| 2,590,295 | Constantine | Mar. 25, 1952 |
| 2,598,032 | Blomen | May 27, 1952 |
| 2,698,745 | Boucher | Jan. 4, 1955 |
| 2,726,853 | Schleyer et al. | Dec. 13, 1955 |
| 2,792,640 | Patterson | May 21, 1957 |
| 2,866,273 | Geldhof | Dec. 30, 1958 |